Oct. 11, 1927. 1,645,097
G. G. FAIRCHILD
AUTOMOBILE CHASSIS GREASING APPARATUS
Filed April 4, 1927 3 Sheets-Sheet 2
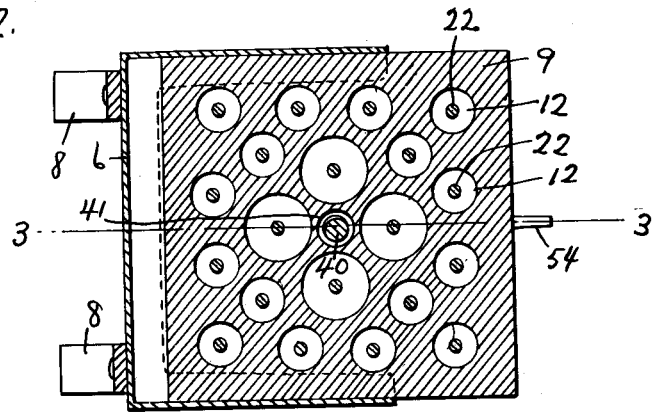
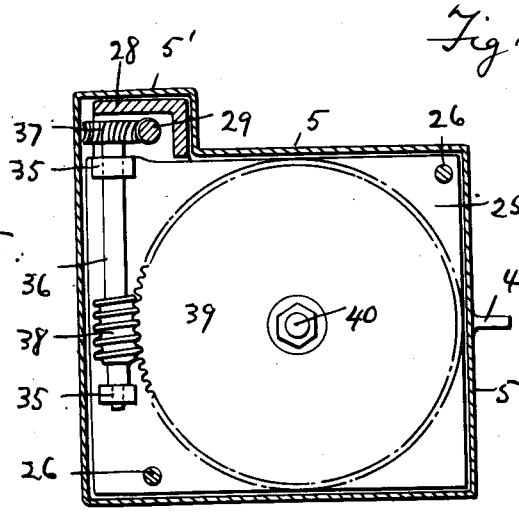 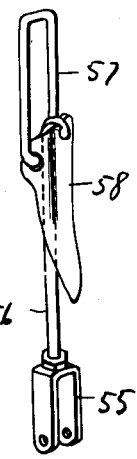
Inventor
Glen G. Fairchild
By Clarence A. O'Brien
Attorney

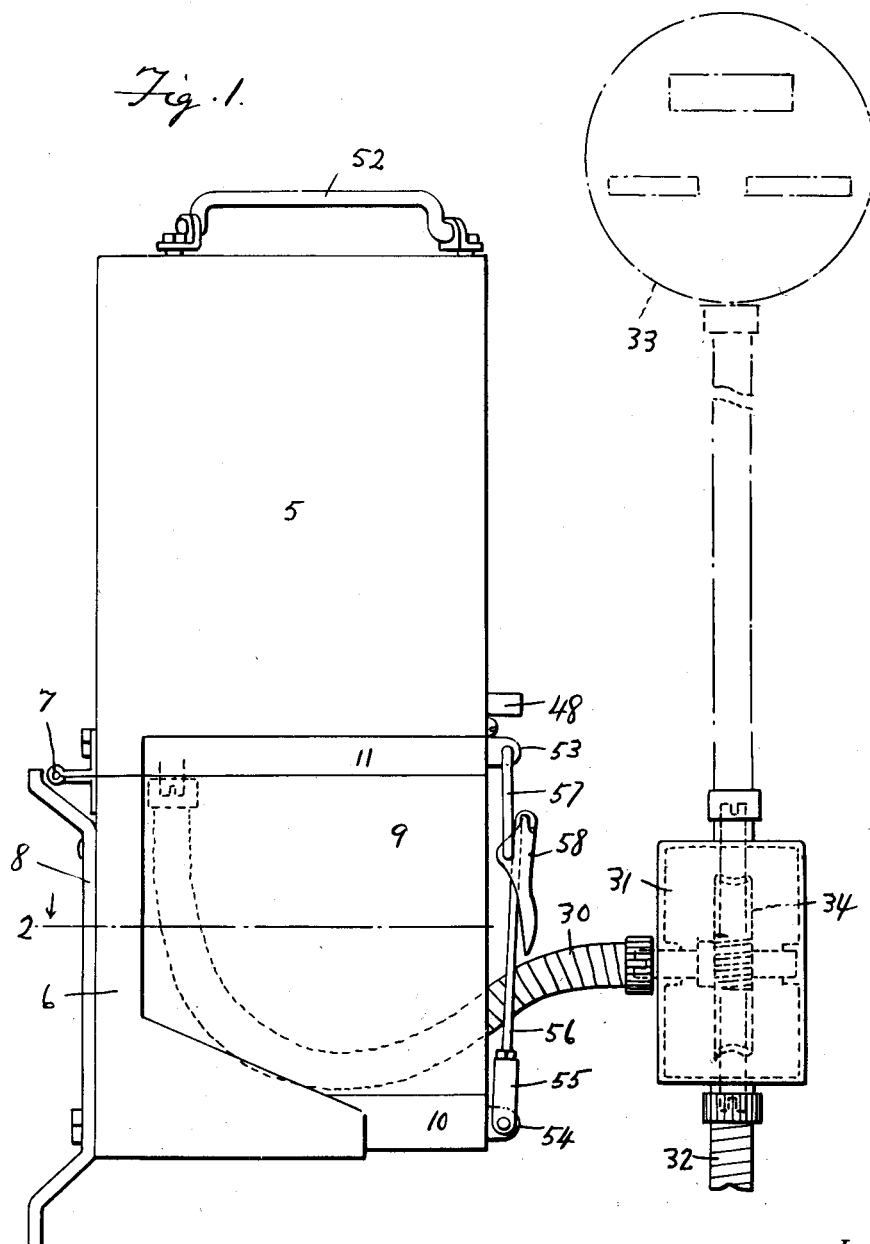

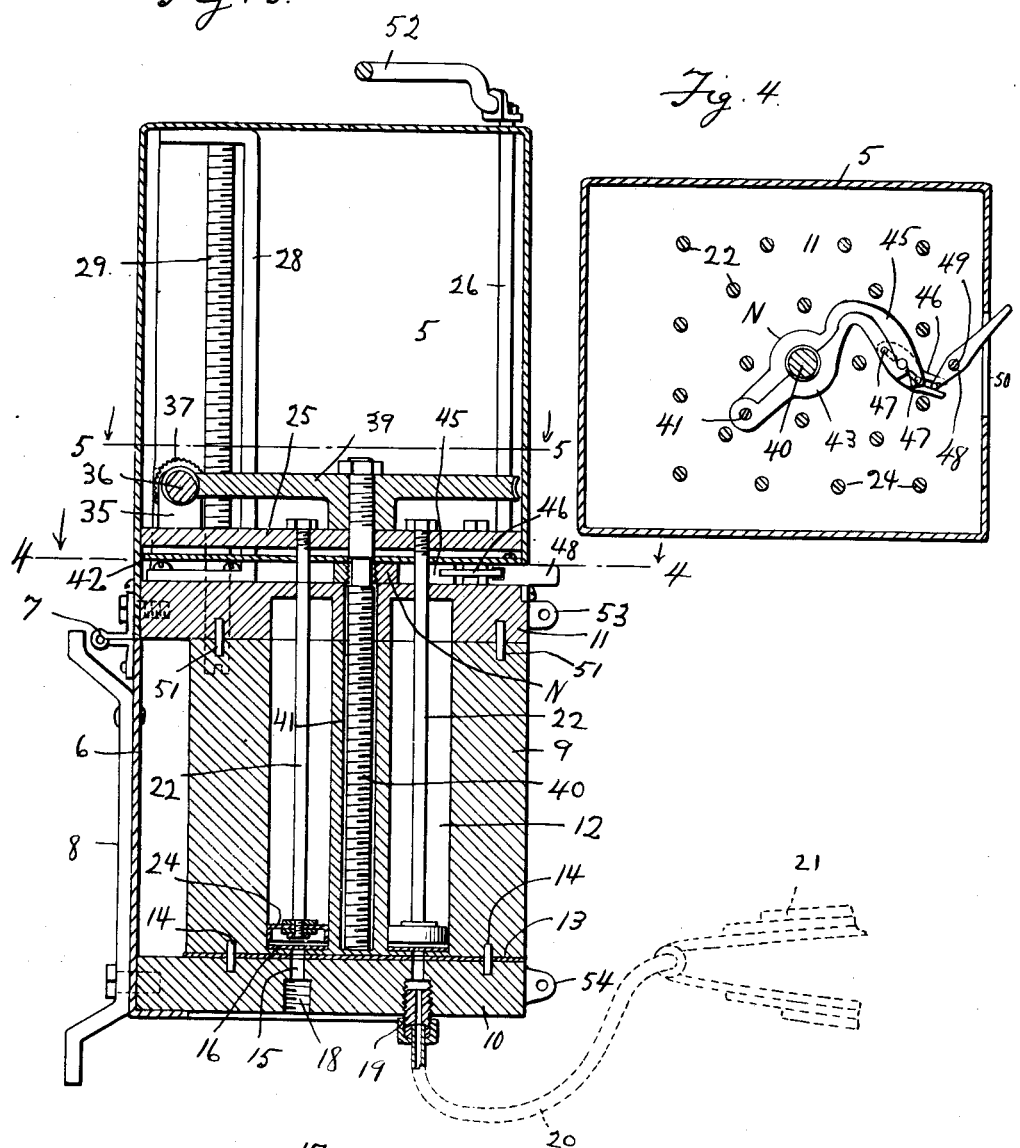

Patented Oct. 11, 1927.

1,645,097

UNITED STATES PATENT OFFICE.

GLEN G. FAIRCHILD, OF INDIANAPOLIS, INDIANA.

AUTOMOBILE CHASSIS-GREASING APPARATUS.

Application filed April 4, 1927. Serial No. 180,846.

The present invention relates to an apparatus for automatically greasing the various parts of an automobile chassis and has for its principal object to provide a structure which is in operation when the automobile is moving to force the grease to the various chassis parts at a predetermined rate, in direct ratio to the speed of the automobile.

Another very important object of the invention resides in the provision of a greasing apparatus of this nature which is operated from the speedometer table.

Another very important object of the invention lies in the provision of a greasing apparatus of this nature which is comparatively simple in its construction, exceedingly compact and convenient, easy to manipulate, refill, and regulate, thoroughly efficient and reliable in operation, comparatively inexpensive to manufacture, strong and durable, not likely to easily become out of order, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawing:

Figure 1 is a side elevation of the apparatus embodying the features of my invention.

Figure 2 is a horizontal transverse section therethrough taken substantially on the line 2—2 of Figure 1.

Figure 3 is a vertical section taken through the device, substantially on the line 3—3 of Figure 2, Figure 4 is a transverse horizontal section taken substantially on the line 4—4 of Figure 3, Figure 5 is a similar section taken on the line 5—5 of Figure 3.

Figure 6 is a perspective view of the washers.

Figure 7 is a perspective view of the lock for holding the casing closed.

Referring to the drawings in detail, it will be seen that the casing comprises an upper portion 5 and a lower portion 6. The upper portion of the casing 5 functions as a top, while the lower portion of the casing 6 functions as a holder for the greased cylinders. These sections 5 and 6 are hingedly connected together as at 7. The section 6 has attached thereto a pair of suitable brackets 8, in order that it may be conveniently mounted on the automobile.

The numeral 9 denotes a cylinder block, having a bottom head 10 and a top head 11. A plurality of different sized cylinders 12 are formed in the block 9 and in the head 11. A packing plate 13 is disposed between the cylinder block 9 and the bottom head 10. Dowel pins 14 connect the block 9 and the head 10. The head 10 is formed with passages 15, communicating with the bottom ends of the cylinders 12 through openings in the packings 13. A washer 16 is disposed in the bottom of each cylinder 12 and is transversely split as at 17, so that the portions between the splits will extend downwardly when the grease is forced therethrough in a manner which will be described later. These parts prevent the grease from flowing from the cylinders except upon pressure. Internally threaded recesses 18 are formed in the passages 15 at their lower ends to receive coupling nipples 19, to which may be attached flexible or other conduits 20 leading to the portion of the chassis to be lubricated, such as the spring 21, indicated in Figure 3, by way of example. It will be understood that there will be one cylinder 12 for every important point of the chassis needing lubrication or as many as may be desired, this may be a matter of preference and controlled, of course, somewhat in accordance with the type of automobile upon which the device is to be used.

Plunger rods 22 are slidable through the head 11 into the cylinder 12 and have mounted on their inner ends plungers 24 for rectilinear movement in the cylinders. A carrier plate 25 is mounted for vertical movement in the casing portion 5, and the upper ends of the rods 22 are fixed thereto in any suitable manner. Rods 26 are mounted in two opposed corners of the casing section 5 and extend through openings in the carrier plate 25 and function as guides therefor. A bracket 28 rises from a portion of the head 11 in an offset portion 5' of the casing section 5 and has journaled therein a worm 29, which is operable by a flexible cable structure 30 connected with a transmission structure 31, with the flexible cable structure 32 of a speedometer mechanism 33, so as to rotate through suitable gearing 34 at a predetermined ratio with respect to said speedometer cable. Brackets 35 ride from the carrier plate 25 and have journaled therein a shaft 36, which has a worm gear 37 in mesh with the worm 29 and is also provided with a worm 38 in mesh with a relatively large worm gear 39, fixed on a shaft 40 which extends down through a central opening in the carrier plate 25 and into a central bore 41, in the block 9. A retainer plate 42 is fixed in the casing section 5 below the carrier plate 25 and above the head 11. This head 11 is also fixed to the bottom end of the section 5. A hinged split nut structure denoted generally by the letter N is disposed between the head 11 and the retainer plate 42, and comprises a pair of sections 43 hinged together as at 44, and having curved ends 45. A member 46 has pin and slot connections 47 with the ends 45, and is swingable by means of a lever 48 pivoted as at 49 between the retainer plate 42 and the head 11. This lever extends through a slot 50 in the casing section 9 so as to be accessible from the exterior thereof.

Dowel pins 51 are fixed either in the head 11 or the block 9 for holding the head and block in proper relation to each other with their cylinders 12 in registry as is shown to advantage in Figure 3. The rods 26 extend through the top of the casing section 5 and have attached thereto a handle 52, for carrying the apparatus from place to place, when this is necessary. A lug 53 projects from the head 11 and a similar lug 54 projects from the head 10. A locking mechanism of suitable formation is engaged with these lugs and in the present instance comprises the fork 55 engaged with the lug 54. A hook rod 56 extends from the fork 55. A link 57 is engaged with the lug 53 and has a lever 58 rockable thereon. Thus, the hooked end of the rod 56 may be engaged with the end of the lever and the lever swung to the position shown in Figures 1 and 7, for locking the sections 5 and 6 in the positions shown in Figures 1 and 3, with the parts assembled.

It is thought that the details of construction should now be sufficiently clear to thoroughly understand the utility, operation, and advantages of the apparatus. To fill the apparatus, the lock structure is released by swinging upwardly on the lever 58 so that the hook rod 56 may be disengaged therefrom. Then the section 5 with the parts mounted therein may be swung open after the handle 52 has been lifted up, causing the rods 26 to be lifted up with the carrier plate 25, to pull the plunger 24 out of the cylinders 12 in the block 9. Obviously, the cylinders 12 may then be filled with grease. The lock nut N which was previously released is then engaged with the lower end of the worm or screw 40 and the section 5 is swung back in place and locked, as will be quite apparent, and thus will be seen that the plunger 24 is at the top of the cylinder 12. Now, when the automobile starts in motion, of course the worm 29 is rotated and transmits this rotary movement through worm gear 37, shaft 36, and worm 38 to worm gear 39, thereby rotating the screw 40 which through the nut N pushes the plate 25 downwardly, at the same time causing the plunger 24 to move downwardly in the cylinder and force the grease through the bottom end thereof as previously indicated.

The present embodiment of the invention has been disclosed in detail merely by way of example, since in actual practice it attains the features of advantage enumerated as desirable in the statement of the invention and the above description. It will be apparent that numerous changes in the details of construction, and in the combination and arrangement of parts may be resorted to without departing from the spirit or scope of the invention as hereinafter claimed or sacrificing any of its advantages.

Having thus described my invention, what I claim as new is:

1. An apparatus of the class described including, in combination, a cylinder block having a plurality of cylinders therein, a bottom head for the block, a top head for the block, said bottom head having passages communicating with the cylinders, a plurality of plunger rods slidable through the top head, plungers on the inner ends of the rods for rectilinear movement in the cylinders, a casing section, a plate slidable in the casing section, means engaging the plate with the rods, said block being provided with a bore, a screw adapted to extend into the bore, journaled in the plates, a split nut mounted on the top head and engageable with the screw, and means for rotating the screw.

2. An apparatus of the class described including, in combination, a cylinder block having a plurality of cylinders therein, a bottom head for the block, a top head for the block, said bottom head having passages communicating with the cylinders, a plurality of plunger rods slidable through the top head, plungers on the inner ends of the rods for rectilinear movement in the cylinders, a casing section, a plate slidable in the casing section, means engaging the plate with the rods, said block being provided with a bore, a screw adapted to extend into the bore, journaled in the plates, a split nut mounted on the top head and engageable with the screw, means for rotating the screw, said last mentioned means comprising a worm gear on the screw above the plate, and a worm meshing therewith.

3. An apparatus of the class described including, in combination, a cylinder block having a plurality of cylinders therein, a bottom head for the block, a top head for the block, said bottom head having passages communicating with the cylinders, a plurality of plunger rods slidable through the top head, plungers on the inner ends of the rod for rectilinear movement in the cylinders, a casing section, a plate slidable in the casing section, means engaging the plate with the rods, said block being provided with a bore, a screw adapted to extend into the bore, journaled in the plates, a split nut mounted on the top head and engageable with the screw, a bracket in the casing section, a worm journaled in said bracket, a shaft, means for journaling the shaft on the plate, a worm gear on the shaft meshing with the worm, a worm on the shaft, a worm gear on the screw meshing with the last mentioned worm.

4. An apparatus of the class described including, in combination, a cylinder block having a plurality of cylinders therein, a bottom head for the block, a top head for the block, said bottom head having passages communicating with the cylinders, a plurality of plunger rods slidable through the top head, plungers on the inner ends of the rods for rectilinear movement in the cylinders, a casing section, a plate slidable in the casing section, means engaging the plate with the rods, said block being provided with a bore, a screw adapted to extend into the bore, journaled in the plates, a split nut mounted on the top head and engageable with the screw, a bracket in the casing section, a worm journaled in said bracket, a shaft, means for journaling the shaft on the plate, a worm gear on the shaft meshing with the worm, a worm on the shaft, a worm gear on the screw meshing with the last mentioned worm, a casing section for the bottom head and the cylinder block, means hinging the casing sections together.

5. An apparatus of the class described including in combination, a cylinder block having a plurality of cylinders therein, a bottom head for the block, a top head for the block, said bottom head having passages communicating with the cylinders, a plurality of plunger rods slidable through the top head, plungers on the inner ends of the rod for rectilinear movement in the cylinders, a casing section, a plate slidable in the casing section, means engaging the plate with the rods, said block being provided with a bore, a screw adapted to extend into the bore journaled in the plates, a split nut mounted on the top head and engageable with the screw, a bracket in the casing section, a worm journaled in said bracket, a shaft, means for journaling the shaft on the plate, a worm gear on the shaft meshing with the worm, a worm on the shaft, a worm gear on the screw meshing with the last mentioned worm, a casing head for the bottom section and the cylinder block, means hinging the casing sections together, means for raising the plate, means for releasing the split nut.

6. An apparatus of the class described including in combination, a cylinder block having a plurality of cylinders therein, a bottom head for the block, a top head for the block, said bottom head having passages communicating with the cylinders, a plurality of plunger rods slidable through the top head, plungers on the inner ends of the rod for rectilinear movement in the cylinders, a casing section, a plate slidable in the casing section, means engaging the plate with the rods, said block being provided with a bore, a screw adapted to extend into the bore journaled in the plates, a split nut mounted on the top head and engageable with the screw, a bracket in the casing section, a worm journaled in said bracket, a shaft, means for journaling the shaft on the plate, a worm gear on the shaft meshing with the worm, a worm on the shaft, a worm gear on the screw meshing with the last mentioned worm, a casing head for the bottom section and the cylinder block, means hinging the casing sections together, means for raising the plate, means for releasing the split nut, means for mounting the top cylinder head in the first mentioned casing section.

7. In an apparatus of the class described comprising a bottom casing section, a top casing section, means for hinging the sections together, a head mounted in the bottom of the bottom casing section, a cylinder block rising from the head, and having a plurality of cylinders therein, said bottom head having passages leading from the cylinders, a top head fixed in the bottom of the upper casing section, rods slidable through the top head into the cylinders, plungers on the inner ends of the rods, a retainer plate fixed in the bottom of the top casing section above the top head in spaced relation thereto, a nut having a pair of sections hingedly connected together mounted between the plate and the top head, said block being provided with a bore, a screw extendible into the bore and engageable with the nut, a plate slidable in the upper casing section, said rods engaged with the said plate, the worm gear on said screw, and means for operating said worm gear.

8. An apparatus of the class described comprising a bottom casing section, a top casing section, means for hinging the sections together, a head mounted in the bottom of the bottom casing section, a cylinder block rising from the head, and having a plurality of cylinders therein, said bottom head having passages leading from the cylinders, a top head fixed in the bottom of the upper casing section, rods slidable through the top head into the cylinders, plungers on the inner ends of the rods, a retainer plate fixed in the bottom of the top casing section above the top head in spaced relation thereto, a nut having a pair of sections hingedly connected together mounted between the plate and the top head, said block being provided with a bore, a screw extendible into the bore and engageable with the nut, a plate slidable in the upper casing section, said rods engaged with the said plate, the worm gear on said screw, rods connected to said plate and extending through the top of the casing, a handle on the last mentioned rods for lifting said plate and the parts attached thereto, brackets on the plate, a shaft journaled in said brackets and having a worm meshing with the worm gear, a worm gear on said shaft, a bracket mounted on the casing, a worm journaled in said last mentioned bracket and connecting with the last mentioned worm gear.

9. An apparatus of the class described comprising a bottom casing section, a top casing section, means for hinging the sections together, a head mounted in the bottom of the bottom casing section, a cylinder block rising from the head, and having a plurality of cylinders therein, said bottom head having passages leading from the cylinders, a top head fixed in the bottom of the upper casing section, rods slidable through the top head into the cylinders, plungers on the inner ends of the rods, a retainer plate fixed in the bottom of the top casing section above the top head in spaced relation thereto, a nut having a pair of sections hingedly connected together mounted between the plate and the top head, said block being provided with a bore, a screw extendible into the bore and engageable with the nut, a plate slidable in the upper casing section, said rods engaged with the said plate, the worm gear on said screw, rods connected to said plate and extending through the top of the casing, a handle on the last mentioned rods for lifting said plate and the parts attached thereto, brackets on the plate, a shaft journaled in said brackets and having a worm meshing with the worm gear, a worm gear on said shaft, a bracket mounted on the casing, a worm journaled in said last mentioned bracket and connecting with the last mentioned worm gear, a flexible cable engaged with said worm, a transmission mechanism attached to said flexible cable, a speedometer cable operatively connected with said transmission.

In testimony whereof I affix my signature.

GLEN G. FAIRCHILD